May 5, 1953

W. H. NEELY 2,637,046

SOUND INSULATING STRIP MEMBER FOR
SINUOUSLY CORRUGATED WIRE SPRINGS

Filed May 19, 1951

INVENTOR.
WILLIAM H. NEELY

BY

Gustav A. Wolff

ATT.

Patented May 5, 1953

2,637,046

UNITED STATES PATENT OFFICE 2,637,046

SOUND INSULATING STRIP MEMBER FOR SINUOUSLY CORRUGATED WIRE SPRINGS

William H. Neely, Cleveland, Ohio, assignor to The Universal Wire Spring Company, Bedford, Ohio, a corporation of Ohio Application May 19, 1951, Serial No. 227,244

8 Claims. (Cl. 5—309)

1

This invention relates in general to sound insulating means for wire springs to absorb undesired sounds or noises caused by contact of the wire of individual wire springs or wire spring assemblies and, more particularly to sound insulating means for so-called flat, sinuously corrugated wire springs and wire spring structures assembled from sinuously corrugated wire springs.

The primary object of this invention is the provision of a sound-insulating strip member of sized material which includes spaced, aligned, offset portions formed by slitting the member in predetermined locations between its side edges at substantially right angles to the longitudinal axis of the member and deforming the member in areas adjacent to said slits to shape the strip with parallelly offset portions adapted to engage and seat loops of flat, sinuously corrugated wire springs when extended through the slits in said member.

Proper sound and noise insulation of flat, sinuously corrugated wire springs is effected by providing the insulating strip member with properly offset portions to eliminate undesired stresses on the loops of the springs. This is accomplished by offsetting the offset portions of the strip member a distance equal to the gage of the wire of the springs, plus the thickness of the strip member, to effect resting of the wire springs on one face of the strip member and contacting of the loops of the wire springs with the other face of the strip member for double-sided insulation of the wire members.

Another object of the invention, therefore, is the provision of a sound-insulating strip member of sized material having spaced, aligned, offset portions formed by slitting the member in predetermined locations between its side edges at substantially right angles thereto and recessing the member in areas adjacent to said slits to effect proper engagement of loops of flat, sinuously corrugated wire springs when coupled with said strip member by threading such loops through the slits thereof for proper contact of both faces of the strip member with the springs and sound insulation of both faces thereof.

Still another object of the invention is the combination of a spring structure assembled from flat, sinuously corrugated wire springs which are arranged in laterally spaced, parallel relation with respect to each other and have corresponding loops arranged in substantial alignment with a sound insulating strip member of the type referred to above, coupled with the springs by threading corresponding loops thereof through

2 the slits in said strip member to effect proper spacing of the springs with respect to each other and sound-insulate the threaded loops of the springs.

Additional objects and novel features of construction, combinations and relations of parts by which the objects in view have been attained, will appear and are set forth in detail in the course of the following specification.

The drawing accompanying and forming part of the specification illustrates a certain practical embodiment of the invention, but it will be apparent as the specification proceeds that the structure and combinations therewith may be modified and changed in various ways without departure from the true spirit and scope of the invention.

In the drawing:

Figs. 1 through 4 disclose the different stages in the manufacture of sound-insulating strips constructed in accordance with the invention, thus:

Figure 1:
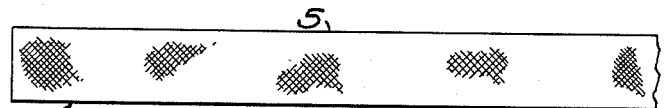
Fig. 1 is a plan view of an elongated strip of material from which the sound-insulating strip is to be formed.
Figure 2:
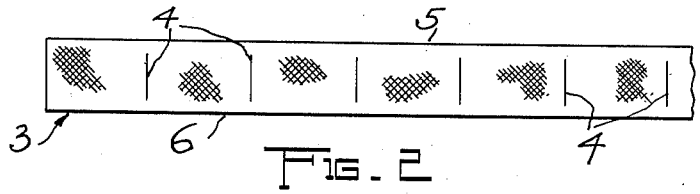
Fig. 2 shows the strip of material disclosed in Fig. 1 slitted on definite predetermined lines.
Figure 3:
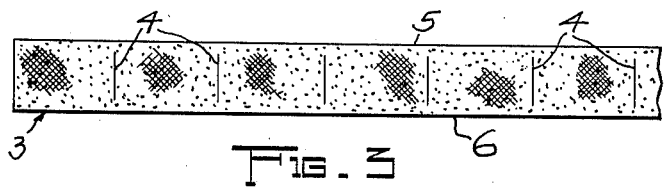
Fig. 3 shows the slitted strip disclosed in Fig. 2 sized.
Figure 4:
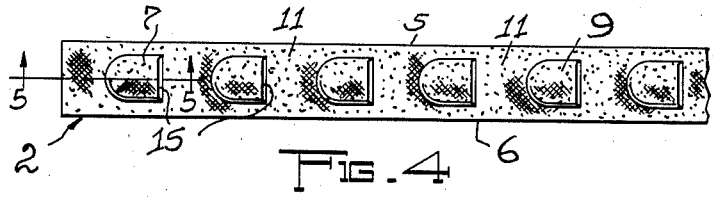
Fig. 4 is a plan view of the finished strip showing the cup-shaped recesses or offsets therein.
Figure 5:
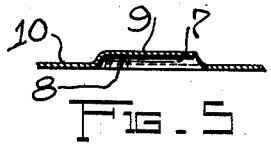
Fig. 5 is a fragmentary, longitudinal, sectional view on line 5—5 of Fig. 4.
Figure 6:
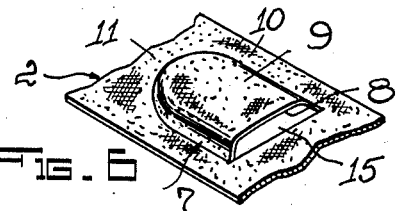
Fig. 6 is an enlarged, fragmentary, perspective view of a portion of the strip shown in Fig. 4.

Referring now in detail to the exemplified form of the invention shown in the drawing, the sound-insulating strip member 2 disclosed therein is shaped from an elongated strip 3 of burlap, jute or similar material which is first slitted on predetermined lines to provide a plurality of equally spaced slits 4 arranged between the side edges 5 and 6 of said strip, at right angles with respect thereto.

When thus slitted strip 3 is sprayed with sizing and areas of the strip near one side of slits 4 are shaped to cup-like recesses 7, the faces 8 of the walls 9 of which are extended in laterally offset relation to the face 10 of strip member 2, thus forming same with aligned cup-like recesses 7 separated from each other by straight strip portions 11. This arrangement permits coupling of insulating strip member 2 with loops 12 of flat, sinuously corrugated, wire springs 14 and sound insulation of certain portions of these springs by preventing direct metal-to-metal contact of the wires of the springs when loaded and insures their quiet and noiseless action.

Shaping of cup-like recesses 7 is effected after sizing of strip 3 by use of heated die or forming members of any desirable construction (not shown) to permanently set the recesses in said strip. Such shaping of recesses 7 forms same with end openings 15 as the material of strip 3 is deformed only at one side of spaced slits 4 and the faces 8 of walls 9 of the recesses are parallelly offset from face 10 of such strip. End openings 15 permit contact of loops 12 of wire springs 14 with bottom walls 9 of the recesses when springs 14, while engaging face 10 of strip 2, are shifted through end opening 15 into cup-like recesses 7.

The depth of these recesses is controlled by the gage of the wire of springs 14 and the approximate thickness of strip 3 to avoid stresses on springs 14 when their loops 12 are extended through openings 15 into cup-like recesses 7, preferably given the shape of said loops to properly seat same.

Figure 7:
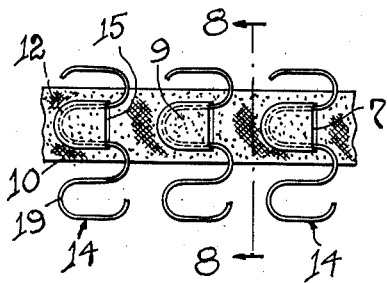
Fig. 7 is a fragmentary, sectional view through a spring construction assembled from flat, sinuously corrugated wire springs, as disclosed in Fig. 8, the section being taken on line 7—7 of said figure, and the springs being coupled with an insulating strip member constructed in accordance with the invention.
Figures 8, 9:
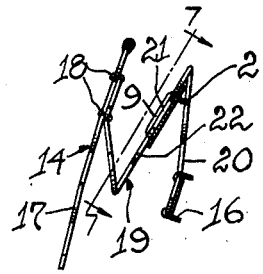
Fig. 8 is a sectional view on line 8—8 of Fig. 7 showing the mounting of the upper ends of the springs.
Fig. 9 is a sectional view similar to Fig. 8 showing the action of the insulating strip member in avoiding contact of the spring wires when the spring structure is loaded.

Seating of loops 12 in cup-like recesses 7 after being threaded through end openings 15 sound-insulates springs 14 in localized areas at opposite faces of the springs as end walls 9 of recesses 7 insulate the front faces of the springs and straight strip portions 11 of insulating strip member 2 insulate the rear faces of the springs as will readily be seen from inspection of Figs. 7 through 9 disclosing part of a spring structure assembled from flat, sinuously corrugated wire springs 14 mounted on a rail 16. Springs 14 include front or resting portions 17 which have attached thereto by clips 18 zig-zag bent, inverted N-shaped, supporting arms 19 formed of zig-zag bent, flat, sinuously-corrugated wire strips. Supporting arms 19 have their free end portions 20 attached to rail member 16 and have their loops 21 of inclined middle portions 22 of the arms extended through end openings 15 in insulating strip member 2 to sound-insulate localized areas at opposite faces of middle portions 22, preventing metal-to-metal contact between the three portions of supporting arms 19 for quiet and noiseless action of the springs under load as will best be seen from inspection of Fig. 9 disclosing the action of insulating strip member 2 when under load the portions of supporting arms 19 are shifted into contact with each other.

In addition to sound-insulating the flat, sinuously corrugated wire springs 14 of spring structures, insulating strip member 2 controls such springs with respect to each other and also controls stability of spring structures by coupling symmetrically located portions of the springs with each other.

Having thus described my invention:
What I claim is:

1. A sound-insulating strip member for flat, sinuously corrugated wire springs embodying an elongated strip of material, and aligned, spaced, cup-shaped recesses in said strip, said recesses having open ends dimensioned, shaped and positioned to permit shifting of loops of sinuously corrugated wire springs through said open ends into said recesses for sound-insulation of predetermined areas of wire springs.

2. A sound-insulating strip member for flat, sinuously corrugated wire springs embodying an elongated, stiffened strip of fibrous material, a plurality of aligned, spaced, cup-shaped recesses integrally formed in said strip, said recesses each dimensioned to seat a loop of a sinuously corrugated wire spring, each of said recesses including an open end dimensioned and located to permit threading of loops of corrugated wire springs through said strip into said cup-shaped recesses for sound insulation of predetermined areas in opposite faces of wire springs.

3. A sound-insulating strip member for flat, sinuously corrugated wire springs embodying an elongated, flat, stiffened strip of fibrous material, a plurality of spaced, cup-shaped recesses integrally formed in said strip in axial alignment therewith, each of said recesses dimensioned to seat a loop of a sinuously corrugated wire spring, said recesses each including at one end an elongated opening located and dimensioned to permit shifting of a loop of a sinuously corrugated wire spring through said opening into said recess when such a spring is resting with one of its opposite surfaces on the strip between the recesses thereof, said strip member adapted to effect sound insulation of definite areas in opposite faces of sinuously corrugated wire springs having a loop seated in a recess of the strip member.

4. A sound-insulating strip member for flat, sinuously corrugated wire springs embodying an elongated, flat, sized strip of fibrous material, a plurality of spaced slots in said strip arranged between the side edges thereof at right angles with respect thereto, and elongated recesses in said strip each arranged adjacent to a slot in said strip providing such recess with an opening in its end wall located and dimensioned to permit shifting of a loop of a sinuously corrugated wire spring through said opening into the recess when such a spring is resting with one of its faces on the strip adjoining slots thereof, said strip adapted to effect sound insulation of areas in opposite faces of sinuously corrugated wire springs having a loop seated in a recess of the strip member.

5. A sound-insulating strip member for flat, sinuously corrugated wire springs embodying an elongated strip of fibrous material having equally spaced slots between its side edges at right angles with respect thereto, and axially aligned, recessed portions in said strip adjacent to said slots, said slots adapted to permit threading of loops of sinuously corrugated wires therethrough for seating such loops in said recessed portions, and contacting areas of opposite faces of springs by the strip member without deforming same.

6. A sound-insulating strip member as described in claim 5, wherein the depth of the recessed portions is proportionate to the gage of the wire of wire springs to be seated in such recesses and equals a distance found by adding the gage of the wire to the thickness of the material of the strip member.

7. The combination of a spring construction assembled from flat, sinuously corrugated wire springs arranged in spaced, parallel relation with respect to each other, with a sound insulating strip member connecting said wire springs in laterally spaced relation with respect to each other, said sound-insulating strip member embodying an elongated strip of fibrous material having spaced slots between its side edges at right angles with respect thereto, and axially aligned recessed portions adjacent to said slots adapted to each seat a loop of a sinuously corrugated wire spring of said spring structure to permit threading of such loops through the slots, seating of said loops in said recessed portions and contact of areas of both surfaces of the corrugated wire springs with said strip without deforming same.

8. The combination described in claim 7, wherein the sinuously corrugated wire springs of said spring construction each include an inverted N-shaped supporting element and wherein said sound insulating strip member is coupled with loops in the middle arms of all said supporting elements.

WILLIAM H. NEELY.

References Cited in the file of this patent

UNITED STATES PATENTS

| Number | Name | Date |
| --- | --- | --- |
| 218,983 | Kellogg | Aug. 26, 1879 |
| 1,874,221 | Barber | Aug. 30, 1932 |
| 1,972,397 | Foster | Sept. 4, 1934 |
| 2,174,711 | Walker | Oct. 3, 1939 |
| 2,247,900 | Wunderlich | July 1, 1941 |
| 2,291,389 | Krakauer | July 28, 1942 |